Sept. 4, 1951      E. J. SVENSON      2,566,381
ACCUMULATOR SYSTEM AND CONTROL
Filed Nov. 22, 1944      2 Sheets-Sheet 1
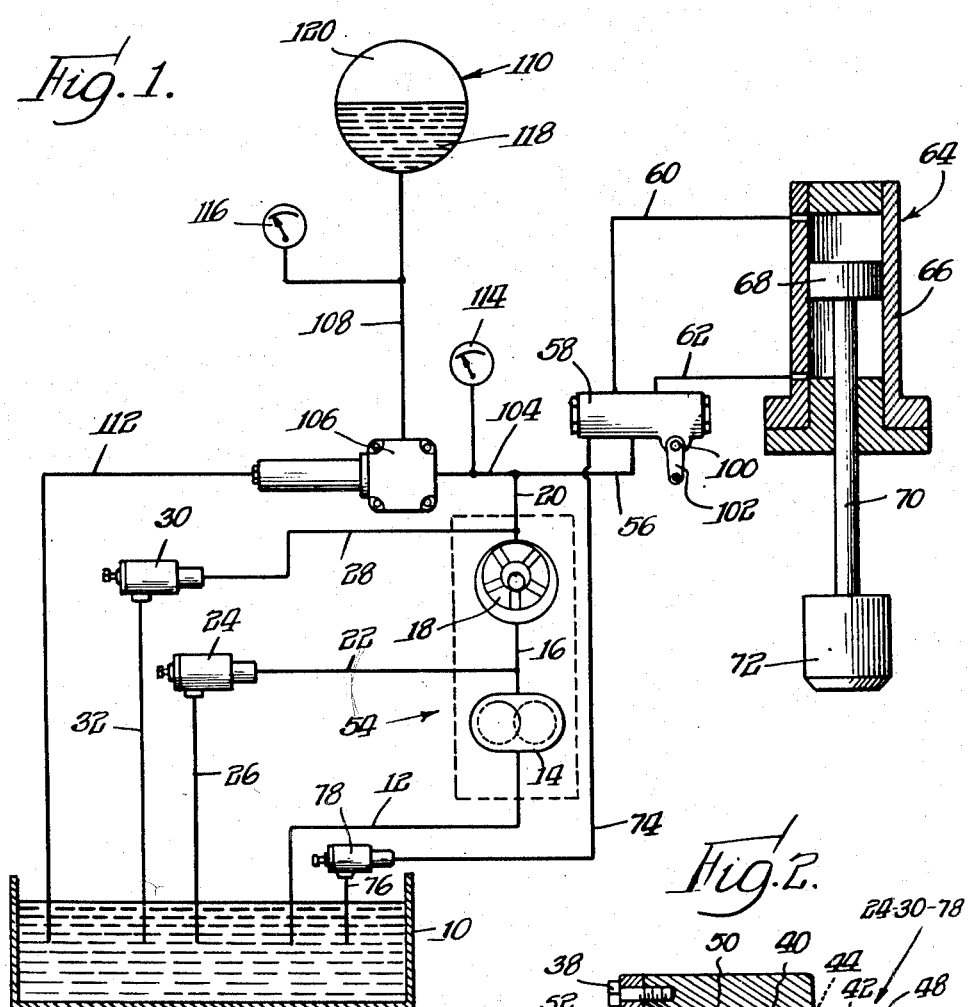
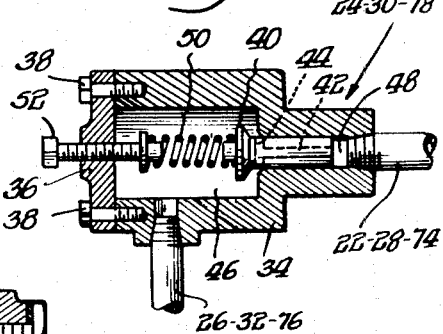
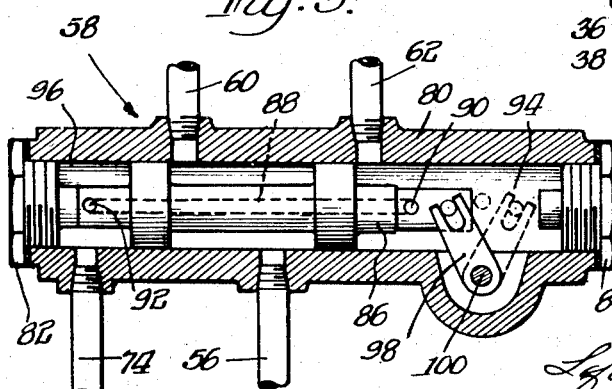
INVENTOR.
Ernest J. Svenson
BY
Loftus, Moore, Olson & Trexler
attys.

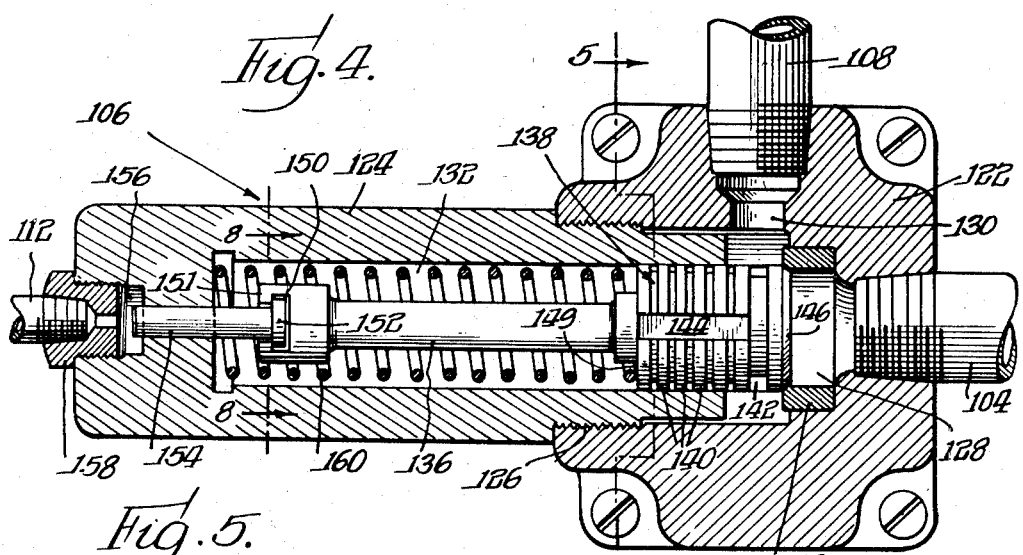

Patented Sept. 4, 1951

2,566,381

UNITED STATES PATENT OFFICE 2,566,381

ACCUMULATOR SYSTEM AND CONTROL

Ernest J. Svenson, Rockford, Ill., assignor to Odin Corporation, Chicago, Ill., a corporation of Illinois Application November 22, 1944, Serial No. 564,652

16 Claims. (Cl. 103—223)

This invention relates to fluid control systems, such for example as for machine tool actuation and the like, and concerns more particularly accumulator systems and their associated control structures and valves.

It is an object of the invention to provide an accumulator system and control valve arrangement for use therewith, of improved construction, and having improved operating characteristics.

More specifically stated, one of the objects of the invention is to provide in an accumulator system, of the compressed gas type, improved and satisfactorily operable means for automatically precluding escape of the actuating gas from the system at all times, and under all conditions of operation.

Further objects of the invention are to provide, in an accumulator system, improved valve means for controlling the functioning of the accumulator, which valve means provides a positive seal for preventing escape of the actuating accumulator gas from the system, when operating pressures therein drop below a predetermined minimum; and wherein the valve means will not stick or lock in operation, will not flutter, and provides a minimum or negligible pressure drop of the fluids transmitted therethrough.

A still further object of the invention is to provide an accumulator system, particularly adapted for machine tool actuation and the like, and associated valve control, of increased efficiency and reliability, and of improved operating characteristics.

Various other objects, advantages and features of the invention will be apparent from the following specification when taken in connection with the accompanying drawings wherein a preferred embodiment of the invention is set forth for purposes of illustration.

In the drawings, wherein like reference numerals refer to like parts throughout:

Fig. 1 is a hydraulic layout, diagrammatic in form, of an accumulator system, constructed in accordance with and embodying the principles of the invention;

Fig. 2 is a detail view of a relief valve structure, such for example as is suitable for use as a part of the system of Fig. 1;

Fig. 3 is a detail view of a reverse valve structure, also included as a part of the system of Fig. 1;

Fig. 4 is a detail view of an accumulator valve structure, forming a part of the present invention and provided for controlling the functioning of the system and for preventing the escape of the actuating accumulator gas therefrom;

Fig. 5 is a transverse sectional view of the valve structure of Fig. 4, taken as indicated by the line 5—5 thereof;

Figs. 6 and 7 are detail illustrative views, on an enlarged scale, showing the accumulator valve element, in closed and open positions, respectively;

Fig. 8 is a partial transverse sectional view of the accumulator valve structure, taken as indicated by the line 8—8 of Fig. 4; and Fig. 9 is a perspective detail view of the valve piston, forming a part of the accumulator valve structure.

In the drawings, the invention has been illustrated as applied to an accumulator system particularly adapted for machine tool actuation, such for example as a hydraulic press structure or the like, as the invention in certain of its aspects is particularly adapted for such use. It is to be understood however that the invention, and its various aspects, are adapted for use with other types of fluid control circuits, including accumulator systems for effecting the actuation and control of other types of machines and mechanisms.

Referring more specifically to the drawings, and first to the fluid control circuit diagrammatically illustrated in Fig. 1, the circuit comprises a suitable reservoir 10 from which liquid, oil in the preferred embodiment illustrated, is drawn through a supply conduit 12 by means of a relatively low pressure gear pump 14. The oil is delivered from the gear pump through a conduit 16 connecting to the inlet of a relatively high pressure plunger pump, as diagrammatically indicated at 18. The pressure of the oil is increased within the plunger pump, and is delivered from the pump through the outlet line 20. A by-pass line 22 connects the conduit 16 with a relief valve 24, the outlet of the relief valve returning to the reservoir through a return line 26, as indicated. Similarly a pipe line 28 connects the conduit 20 with a relief valve 30, the return from this valve passing to the reservoir through a return line as indicated at 32.

The details of the relief valves 24 and 30 form no part of the present invention. The two valves may be similar in structure, and one suitable form of construction is illustrated in Fig. 2. As shown, the valve comprises a casing 34 to which are connected the inlet and outlet pipes 22 and 26, in the case of the valve 24, and the pipes 28 and 32, in the case of the valve 30. The casing 34 is closed by a cover 36 held in place on the casting by suitable screws 38. The shiftable relief valve element 40 is provided with a longitudinal passageway 42 and a communicating transverse passageway 44, the latter being adapted to be brought into communication with the central valve chamber 46 when the valve is shifted to open position, as shown in Fig. 2. As will be understood, fluid pressure within the passage 48 tends to shift the valve member 40 to open position, whereas the valve is urged toward closed position by means of a compression spring 50 adjustably urged against the valve member by means of an adjustment screw 52. Adjustment of the screw 52 adjusts the spring pressure of the spring 50, whereby to adjustably predetermine the opening or relief pressure of the shiftable relief valve member 40, whereby to determine the relief pressures of the conduits 22 and 28, respectively.

The details of the pump structures 14 and 18 likewise form no part of the present invention, and any suitable form of pump may be employed, depending upon the requirements of the particular installation. In the particular preferred embodiment illustrated, the gear pump 14 and the plunger pump 18 are formed as part of a combined pumping unit, generally indicated by the numeral 54, which may for example be of the type shown in my copending application, Serial No. 627,025, filed July 30, 1932 and entitled "Hydraulic Propelling Mechanism", now issued as Patent No. 2,363,707, dated November 28, 1944. As shown in said application the high pressure plunger pump 18 comprises a plurality of successively operable plunger and cylinder structures, the displacements of which are manually adjustable by suitable means. The gear pump 14 comprises a charging means for the higher pressure plunger pump. In said application means is provided for simultaneously adjusting the delivery of the gear pump 14 as the displacement of the plunger pump is varied, in which instance the relief valve 24 may be eliminated. Accordingly the use of such relief valve, as herein illustrated, is optional.

The outlet conduit 20 of the plunger pump connects with a conduit 56 leading to a reverse control valve 58. A pair of conduits 60 and 62 connect the reverse valve respectively to the opposite ends of an actuator structure generally indicated at 64, and comprising a cylinder and piston structure 66—68. The piston 68 is connected by means of a piston rod 70 to a device to be actuated, as indicated at 72, which device, in the particular embodiment illustrated, may comprise the pressure plunger of a hydraulic press or the like.

A return line 74—76 leads from the reverse valve back to the reservoir, such return line preferably including a back pressure relief valve for maintaining a predetermined back pressure in the system. Such back pressure relief valve may be structurally similar to the valves 24 and 30, previously described, and as indicated in Fig. 2.

Any suitable form of reverse valve 58 may be employed, the particular details thereof again forming no part of the present invention. As shown in Fig. 3, the reverse valve may comprise a casing 80 closed at its ends by a pair of threaded plug members 82 and 84, and enclosing a shiftable reverse valve member 86. The valve member 86 is provided with a longitudinal passageway 88 communicating with a pair of radial passageways 90 and 92, said passageways connecting a pair of end chambers 94 and 96 within the valve casing, the latter of which is connected with the return line 74.

When the valve member 86 is in the extreme leftward position illustrated in Fig. 3, flow from the inlet conduit 56 is directed to the conduit 60 leading to the upper end of the actuator 64, the piston 68 of which is thereby propelled in a downward direction. The return fluid from the actuator is directed through conduit 62 into the reverse valve end chamber 94, from which it is conducted by the valve passages 90, 88 and 92 into the end chamber 96 and through the return line 74. When the valve member is shifted to the extreme right, from the position shown in Fig. 3, oil from the supply conduit 56 is directed to the conduit 62 to effect an upward shifting of the actuator piston 68. The return fluid in this instance is returned from the actuator through the conduit 60 into the reverse valve end chamber 96 and to the return line 74. When the valve is shifted to a neutral or mid-position, between its two ends positions, transmission of fluid from the conduit 56 into either conduit 60 or 62 is blocked. The shifting of the valve may be effected by means of an arm 98 fixed to a pivot shaft 100, the end of which carries a manually operable control handle or lever 102.

The outlet conduit 20 of the plunger pump also connects with a conduit 104 leading to an accumulator control valve 106. The accumulator control valve is connected by means of a conduit 108 with an accumulator 110, and by means of a drain conduit 112 with the reservoir 10. As shown, pressure gauges 114 and 116 may be associated respectively with the conduits 104 and 108, so as to indicate the pressure conditions therein.

The accumulator 110 is diagrammatically indicated. Preferably it may comprise a drum-like reservoir of suitable size, the lower portion of which is adapted to contain the actuating oil of the system, as indicated at 118, whereas the upper portion of the accumulator contains a body of compressed gas, as indicated at 120, compressed and trapped within the accumulator drum by the oil body. Such gas may be compressed air, or preferably an inert gas such as nitrogen, in the preferred embodiment illustrated.

Particular attention is directed to the accumulator control valve 106, the details of which are illustrated in Figs. 4 to 9 inclusive. As best shown in Fig. 4, the accumulator valve comprises a main casing 122, and an auxiliary casing 124 threaded into the main casing by threaded connection as indicated at 126. The conduit 104 is threaded into the main casing member, a chamber 128 being formed at the conduit end. Similarly the conduit 108 is threadedly connected to the main casing member, a chamber 130 being formed at the end of the latter conduit. Shiftable within the central chamber 132 of the auxiliary casing 124 is a valve member generally indicated in Fig. 9 by the reference numeral 134, and comprising a stem portion 136 and a head portion 138. The latter is formed with a series of annular portions 140 for guiding the valve member in its longitudinally shiftable movements within the chamber 132; and with an annular groove 142 and a series of longitudinal grooves 144 by means of which fluid pressure is freely communicated between the valve chambers 130 and 132. The valve head portion is also provided with a seat portion 146 adapted for cooperation with an annular casing valve seat 148, in a manner best illustrated in Figs. 6 and 7 wherein the valve is shown respectively in closed and open positions.

As best shown in Figs. 4 and 8, the end of the valve stem is provided with a milled slot 150 adapted to receive the head 152 of an auxiliary stem member 154. The end of this auxiliary stem member communicates with a chamber 156 closed by a threaded plug 158 to which is connected the end of the drain conduit 112.

A compression spring 160 bears against the head 138 of the shiftable valve piston or member, so as to urge it to the right, or into closed position as shown in Figs. 4 and 6. As will be best seen in Fig. 4, the spring 160 is relatively long, and is preferably selected and constructed so that the tension within the spring is increased only a slight or minimum amount as the valve is shifted from closed to open position.

In the operation of the structure, assuming the pumping unit 54 to be connected to a continuously operating power source, the gear pump 14 will transmit the oil from the reservoir 10 to the plunger pump 18, and the plunger pump will in turn transmit the fluid, at higher pressure, through its outlet conduit 20 to the reverse valve 58. If the output of the gear pump is gauged so as to be equal to the requirements of the plunger pump, in all of its adjusted displacements, the relief valve 24 is functionally inoperative, as previously set forth. If the gear pump is employed to pump an excess of oil, beyond the requirements of the plunger pump, such excess is diverted back to the reservoir through the relief valve 24, at the pressure setting thereof. When the plunger pump 18 is operating, if the reverse valve 58 is in neutral position, and if the accumulator 110 has been filled to its full working capacity, as will later be more particularly described, the relief valve 30 will open to divert to the reservoir the oil delivered from the plunger pump mechanism. Normally, however, during operation of the actuator 64, the relief valve 30 is closed. As will be understood, the relief setting of the valve 30 is materially greater than that of the valve 24.

Shifting of the reverse valve member 86 from its neutral or mid-position to the left, as shown in Fig. 3, causes the pressure oil or fluid to be transmitted through the conduit 60 so as to propel the actuator piston 68 in a downward direction, as previously described, the return fluid from the actuator being transmitted through the conduits 62 and 74, and through the relief valve 78 and conduit 76 to the reservoir. As will be understood, the valve 78 may be set at a suitable low relief pressure, below the setting of the valves 24 and 30. Shifting of the reverse valve member 80 in the opposite direction, or to the extreme right from its position shown in Fig. 3, causes the pressure fluid to be transmitted through the conduit 62 so as to shift the actuator piston in an upward direction.

Oil from the accumulator 110 is employed, during the operation of the system, to augment or supplement the volumetric capacity of the plunger pump, thereby increasing the work capacity of the actuator 64, in respect to the size and capacity of the plunger pump, and power consumed thereby. The shiftable valve member 134 of the accumulator valve 106 is normally open, to permit the operative functioning of the accumulator structure, but automatically closes if the pressure in the conduit 104 drops below a predetermined minimum, whereby to preclude escape of the nitrogen gas from the accumulator reservoir. As best shown in Fig. 4, the action of the pressure fluid upon such areas as the seat surface 146, Fig. 7, and the valve piston end face 147 tends to shift the accumulator valve member to the left, or into open position, whereas the action of the pressure fluid upon such surfaces of the valve as indicated at 149 and 151 tends to shift the valve to the right, or into closed position. When the valve is in open position, as shown in Fig. 7, the areas acted upon, tending to shift or maintain the valve in open position are greater than those acted upon, tending to shift the valve to closed position, by an amount equal to the cross sectional area of the auxiliary valve stem 154, the leftward end of which is connected to the drain line 112 and hence subjected to no pressure. As will be understood, only seepage or leakage fluid, escaping along the surface of the auxiliary valve stem 154, is transmitted to the drain line 112. The compression spring 160 opposes this resultant fluid pressure thrust, tending to move the valve to the right into closed position. The strength of the spring is so selected, in respect to the area differential, that when the fluid pressure acting upon the valve surfaces is above a predetermined amount, the thrust of the spring is overcome and the valve is maintained in open position. By way of illustrative example, let it be assumed that such pressure is 2000 pounds per sq. in. Accordingly it will be seen that so long as the pressure in the conduit 104 remains at or above 2000 pounds per sq. in., the accumulator valve 134 will be maintained to the left or in open position as illustrated in Fig. 7, thereby permitting free passage of oil from the conduit 104 to and from the accumulator reservoir 110.

Such circulation of oil to and from the accumulator reservoir permits oil from the plunger pump 18 to be transmitted into the accumulator to compress the trapped gas during such times as the reverse valve 58 is in neutral position and the actuator 64 inoperative; and to be transmitted by the action of the gas from the accumulator to supplement the delivery of the plunger pump when the actuator 64 is set into operation. By this means, as previously set forth, the power available for transmission to the actuator is increased in respect to the capacity of the plunger pump, permitting use of a relatively smaller pump structure, or permitting a lower volumetric setting thereof, whereby to reduce costs, power consumption, et cetera. As also previously set forth, if the actuator 64 remains idle for a protracted period after the accumulator reservoir has been filled to a desired capacity, compressing the nitrogen gas therein to a predetermined maximum, the relief valve 30 will open to divert the pump delivery if the pump remains in operation. Such relief pressure, by way of illustrative example, may be 3500 pounds per sq. in.

Considerable difficulty has heretofore been encountered in providing satisfactory means for preventing inadvertent escape of gas from the accumulator reservoir when the pressure in the conduit 104 drops below a predetermined minimum due to a pipe line break, pump failure, power failure, leakage of valves during periods of shut down, or other causes. In accordance with the present invention the accumulator valve 106 functions automatically to preclude such gas escape. More particularly, if the pressure in the conduit 104 should drop below the predetermined pressure of 2000 pounds per sq. in., as above set forth, the strength of the spring 160 becomes greater than the resultant fluid pressure thrust upon the valve, due to the differential exposed area when the valve is in open position, the spring thereupon acting to shift the valve to closed position, as shown in Fig. 6. Immediately when the valve has been closed, it will be seen that a substantial portion of its seat surface 146 is no longer subjected to fluid pressure contact. The valve area tending to shift the valve to the left, as seen in Fig. 4, or into open position is thereby reduced so that even if the pressure in the pipe 104 drops no further (viz., the pressure in pipes 104 and 108 remains the same), the available accumulator pressure from the pipe 108 causes a fluid pressure thrust of the valve into closed or seating position, augmenting the thrust of the spring 160. Such fluid pressure sealing of the valve in closed position provides an effective and positive seal against escape of fluid from the accumulator; and inasmuch as the force of the spring is not relied upon to hold the valve in closed position, a relatively light spring may be employed. By predetermining the area of the seat 146 which becomes blocked off from fluid pressure contact, when the valve is closed, a fluid pressure thrust of desired magnitude, tending to hold the valve in closed position, may be obtained. Any further dropping of the pressure within the conduit 104 tends to cause the valve to be more firmly thrust into seated position by the accumulator fluid pressure. The closing pressure of the valve is predetermined so that the valve closes before the liquid or oil supply within the accumulator reservoir is exhausted, so that escape of the trapped and compressed accumulator gas is prevented.

As the pressure within the pipe 104 increases, the accumulator valve will not open until the pressure has been increased a predetermined increment above the valve closing pressure of 2000 pounds per sq. in.; due to the fact that when the valve is in closed position the lesser area thereof is exposed to be acted upon by the pressure fluid in chamber 128. In the illustrative embodiment, for example, it may be necessary to increase the pressure to 2100 pounds per sq. in. in the pipe 104 and in chamber 128 to overcome the balancing counter-pressure of the accumulator, and the action of the spring 160, whereby to effect opening of the valve. Immediately as the valve begins its opening movement, the greater area of the valve seat 146 again becomes exposed to the action of the fluid pressure, causing the valve to snap fully into open position, as shown in Fig. 7. Even when fluid pressure within the pipes 104 and 108 becomes balanced, such pressure being well above the critical closing pressure of the valve of 2000 pounds per sq. in., the valve is held in fully open position against the action of the compression spring. Inasmuch as the valve is thus snapped immediately into a fully open position, it exerts no throttling action on the oil transmitted from the pipe 104 to the pipe 108, and the accumulator is quickly brought up to full pump pressure. Further, inasmuch as there is a predetermined increment between the closing and opening pressures of the valve, there is no pressure at which the valve tends to flutter between open and closed positions, thus insuring smooth and efficient operation. When in open position the valve floats within the valve chamber bore 132, thus insuring a free-acting, reliable and non-sticking structure. As the valve closes, as previously described, it is to be noted that it closes smoothly under the relatively slight closing action of the spring, and becomes clamped tight, with increasing fluid pressure, at the precise instant of closing contact, thus avoiding shock and impact in the closing of the valve structure with resulting sticking, and impact in the hydraulic system.

It is obvious that various changes may be made in the specific embodiment set forth for purposes of illustration without departing from the spirit of the invention. The invention is accordingly not to be limited to the embodiment shown and described, but only as indicated in the following claims.

The invention is hereby claimed as follows:

1. A fluid control system for effecting the operation of a fluid pressure responsive actuator, said system comprising a primary source of pressure fluid, circuit connections for interconnecting the actuator and said primary pressure source to effect the shifting of the actuator, said primary pressure source comprising lower and higher pressure pumps successively operable upon the fluid, a secondary source of pressure fluid, and means interconnecting said circuit connections and said secondary pressure source, said last named means including a normally open valve, and means controlled by the pressure in said circuit connections for closing said valve.

2. An accumulator liquid control system for effecting the operation of a liquid pressure responsive actuator, said system comprising lower and higher pressure pumping means successively operable upon liquid for supplying liquid under pressure, relief valves associated respectively with each of said pumping means, circuit connections for interconnecting the actuator and said pumping means to effect the shifting of the actuator, an accumulator comprising a gas under pressure and a reservoir of liquid compressed thereby, normally open valve means interconnecting said circuit connections and the accumulator, and means controlled by the pressure in said circuit connections for effecting the closing of said valve means when the pressure in said circuit connections drops below a predetermined amount.

3. A fluid control system for effecting the operation of a fluid pressure responsive actuator, said system comprising a primary source of pressure fluid, circuit connections for interconnecting the actuator and said primary pressure source to effect the shifting of the actuator, a secondary source of pressure fluid, and means interconnecting said circuit connections and said secondary pressure source, said last named means including a normally open valve, means comprising a face of given area on said valve for effecting the closing of said valve when the pressure in said circuit connections drops below a predetermined value, and means comprising a face of lesser area on said valve for effecting the opening of said valve when the pressure in said circuit connections exceeds a substantially greater value so as to provide a substantial difference between the closing and opening pressures of said valve.

4. An accumulator liquid control system for effecting the operation of a liquid pressure responsive actuator, said system comprising pumping means for supplying liquid under pressure, circuit connections for interconnecting the actuator and said pumping means to effect the shifting of the actuator, an accumulator comprising a gas under pressure and reservoir of liquid compressed thereby, normally open valve means interconnecting said circuit connections and the accumulator, and means comprising faces of different area on said valve means controlled by the pressure in said circuit connections for effecting the closing of said valve means when the pressure in said circuit connections drops below a predetermined value and for effecting the opening of said valve means when the pressure in said circuit connections rises above a substantially greater value so as to provide a substantial difference between the closing and opening pressures of said valve.

5. A fluid control system for effecting the operation of a fluid pressure responsive actuator, said system comprising a primary source of pressure fluid, circuit connections for interconnecting the actuator and said primary pressure source to effect the shifting of the actuator, a secondary source of pressure fluid, means interconnecting said circuit connections and said secondary pressure source, said last named means including a normally open valve, means upon the valve controlled by the pressure in said circuit connections for applying a predetermined force resultant to effect the closing of said valve, and means including a substantial area of the valve subjected to a reduced pressure as the valve reaches closed position operable upon the closing of the valve for applying a substantial additional force resultant for holding the valve in closed position.

6. A fluid control system for effecting the operation of a fluid pressure responsive actuator, said system comprising a primary source of pressure fluid, circuit connections for interconnecting the actuator and said primary pressure source to effect the shifting of the actuator, a secondary source of pressure fluid, and means interconnecting said circuit connections and said secondary pressure source, said last named means including a normally open valve, and means upon the valve controlled by the pressure in said circuit connections for closing and opening said valve, the opening means comprising means for applying a predetermined force resultant to the valve to effect the opening thereof, and means including a substantial area of the valve subjected to an increased pressure upon the initial opening movement of the valve operable as the valve opens for substantially increasing said opening force resultant.

7. A fluid control system for effecting the operation of a fluid pressure responsive actuator, said system comprising a primary source of pressure fluid, circuit connections for interconnecting the actuator and said primary pressure source to effect the shifting of the actuator, a secondary source of pressure fluid, and means interconnecting said circuit connections and said secondary pressure source, said last named means including a normally open valve, and means upon the valve controlled by the pressure in said circuit connections for closing and opening said valve, the closing means including means for applying a predetermined force resultant tending to close the valve and control means for substantially increasing the closing force resultant as the valve reaches closed position, and the opening means comprising means for applying a predetermined force resultant to effect the opening of the valve, and control means for substantially increasing the opening force resultant as the valve is moved from closed position, said control means comprising a substantial area of the valve subjected to a decreased pressure as the valve is closed and an increased pressure as the valve is opened.

8. A fluid control system for effecting the operation of a fluid pressure responsive actuator, said system comprising a primary source of pressure fluid, circuit connections for interconnecting the actuator and said primary pressure source to effect the shifting of the actuator, a secondary source of pressure fluid, and means interconnecting said circuit connections and said secondary pressure source, said last named means including a normally open valve, and means controlled by the pressure in said circuit connections upon the valve for effecting the closing of said valve when the pressure in the circuit connections drops below a predetermined value and for effecting the opening of the valve when the pressure in said circuit connections exceeds a predetermined greater value, the fluid forces acting to close the valve being activated from both said pressure sources, and the fluid forces acting to open the valve being activated from only one of said pressure sources.

9. An accumulator liquid control system for effecting the operation of a liquid pressure responsive actuator, said system comprising pumping means for supplying liquid under pressure, circuit connections for interconnecting the actuator and said pumping means to effect the shifting of the actuator, an accumulator comprising a gas under pressure and a reservoir of liquid compressed thereby, normally open valve means interconnecting said circuit connections and the accumulator, and means controlled by the pressure in said circuit connections upon the valve for effecting the closing of said valve when the pressure in the circuit connections drops below a predetermined value and for effecting the opening of the valve when the pressure in said circuit connections exceeds a predetermined greater value, the fluid forces acting to close the valve being activated from both the pumping means and the accumulator, and the fluid forces acting to open the valve being activated only from the pumping means.

10. A fluid control system for effecting the operation of a fluid pressure responsive actuator, said system comprising a reservoir, a primary source of pressure fluid, circuit connections for interconnecting the actuator and said primary pressure source to effect the shifting of the actuator, a secondary source of pressure fluid, and means interconnecting said circuit connections and said secondary pressure source, said last named means including a housing, a valve in said housing having a predetermined net area thereon subjected to the pressure in said circuit connections in a direction for thrusting the valve into open position, a spring tending to urge the valve into closed position, a stem on the valve projecting through an opening in said housing, and a drain line interconnecting the valve stem and said reservoir.

11. A fluid control system for effecting the operation of a fluid pressure responsive actuator, said system comprising a primary source of pressure fluid, circuit connection for interconnecting the actuator and said primary pressure source to effect the shifting of the actuator, a secondary source of pressure fluid, and means interconnecting said circuit connections and said secondary pressure source, said last named means including a valve having a predetermined net area thereon subjected to the pressure in said circuit connections in a direction for thrusting the valve into open position, a spring tending to urge the valve into closed position, and operating means for the valve comprising means for decreasing the extent of said area a substantial amount as the valve reaches closed position to augment the force of the spring in holding the valve closed.

12. A fluid control system for effecting the operation of a fluid pressure responsive actuator, said system comprising a primary source of pressure fluid, circuit connection for interconnecting the actuator and said primary pressure source to effect the shifting of the actuator, a secondary source of pressure fluid, and means interconnecting said circuit connections and said secondary pressure source, said last named means including a valve having a predetermined net area thereon subjected to the pressure in said circuit connections in a direction for thrusting the valve into open position, a spring tending to urge the valve into closed position, and operating means for the valve comprising means for increasing the extent of said area a substantial amount as the valve is moved from closed position to overcome the force of the spring to hold the valve open.

13. A fluid control system for effecting the operation of a fluid pressure responsive actuator, said system comprising a primary source of pressure fluid, circuit connections for interconnecting the actuator and said primary pressure source to effect the shifting of the actuator, a secondary source of pressure fluid, and means interconnecting said circuit connections and said secondary pressure source, said last named means including a valve having a predetermined net area thereon subjected to the pressure in said circuit connections in a direction for thrusting the valve into open position, a spring tending to urge the valve into closed position, and operating means for the valve comprising means for decreasing the extent of said area a substantial amount as the valve reaches closed position to augment the force of the spring in holding the valve closed, and for correspondingly increasing the extent of said area a substantial amount as the valve is initially moved from closed position to overcome the force of the spring to hold the valve open.

14. An accumulator liquid control system for effecting the operation of a liquid pressure responsive actuator, said system comprising pumping means for supplying liquid under pressure, circuit connections for interconnecting the actuator and said pumping means to effect the shifting of the actuator, an accumulator comprising a gas under pressure and a reservoir of liquid compressed thereby, means including a normally open valve interconnecting said circuit connections and the accumulator, said valve having a predetermined area thereon subjected to the pressure in said circuit connections tending to thrust the valve toward open position, a spring tending to thrust the valve toward closed position, the spring and the fluid pressure upon the valve comprising the sole actuating means therefor, and means for decreasing the extent of said area as the valve reaches closed position and for increasing the extent of said area as the valve is initially moved from closed position.

15. An accumulator liquid control system for effecting the operation of a liquid pressure responsive actuator, said system comprising pumping means for supplying liquid under pressure, circuit connections for interconnecting the actuator and said pumping means to effect the shifting of the actuator, an accumulator comprising a gas under pressure and a reservoir of liquid compressed thereby, means including a normally open valve interconnecting said circuit connections and the accumulator, said valve having a plurality of areas adapted to be acted upon by the fluid pressure in said circuit connections tending to move the valve toward open and closed positions, said areas including a seat portion tending to shift the valve toward open position, a valve stem portion having its end disposed out of communication with said circuit connections whereby to decrease the valve area tending to move the valve toward closed position, and a spring tending to thrust the valve toward closed position, said spring and the fluid pressure upon the valve comprising the sole actuating means for the valve.

16. An accumulator liquid control system for effecting the operation of a liquid pressure responsive actuator having a reciprocable actuator piston, said system comprising pumping means for supplying liquid under pressure, circuit connections including a reverse valve for interconnecting the actuator and the pumping means to effect the reciprocation of the actuator piston, a relief valve connected in said circuit connections between the pumping means and the actuator and actuated by the pressure therein, an accumulator comprising a gas under pressure and a reservoir of liquid compressed thereby, means including a normally open accumulator valve balanced in respect to the pressure in the accumulator when the valve is in closed position interconnecting said circuit connections and the accumulator, said valve having means thereon acted on by the pressure in said circuit connections maintaining the valve open when the pressure is above a predetermined value, and a spring tending to shift the valve into closed position.

ERNEST J. SVENSON.

REFERENCES CITED

The following references are of record in the file of this patent:

UNITED STATES PATENTS

| Number | Name | Date |
|---|---|---|
| 811,185 | TenEyck | Jan. 30, 1906 |
| 2,211,483 | Tyler | Aug. 13, 1940 |
| 2,239,566 | Mercier | Apr. 22, 1941 |
| 2,298,512 | Rockwell | Oct. 13, 1942 |
| 2,363,707 | Svenson | Nov. 28, 1944 |

FOREIGN PATENTS

| Number | Country | Date |
|---|---|---|
| 183,290 | Switzerland | 1936 |
| 329,845 | Great Britain | 1930 |